July 9, 1940.   S. L. C. COLEMAN   2,207,088
FLUID PRESSURE SPRING DEVICE
Filed Oct. 8, 1937   4 Sheets-Sheet 1
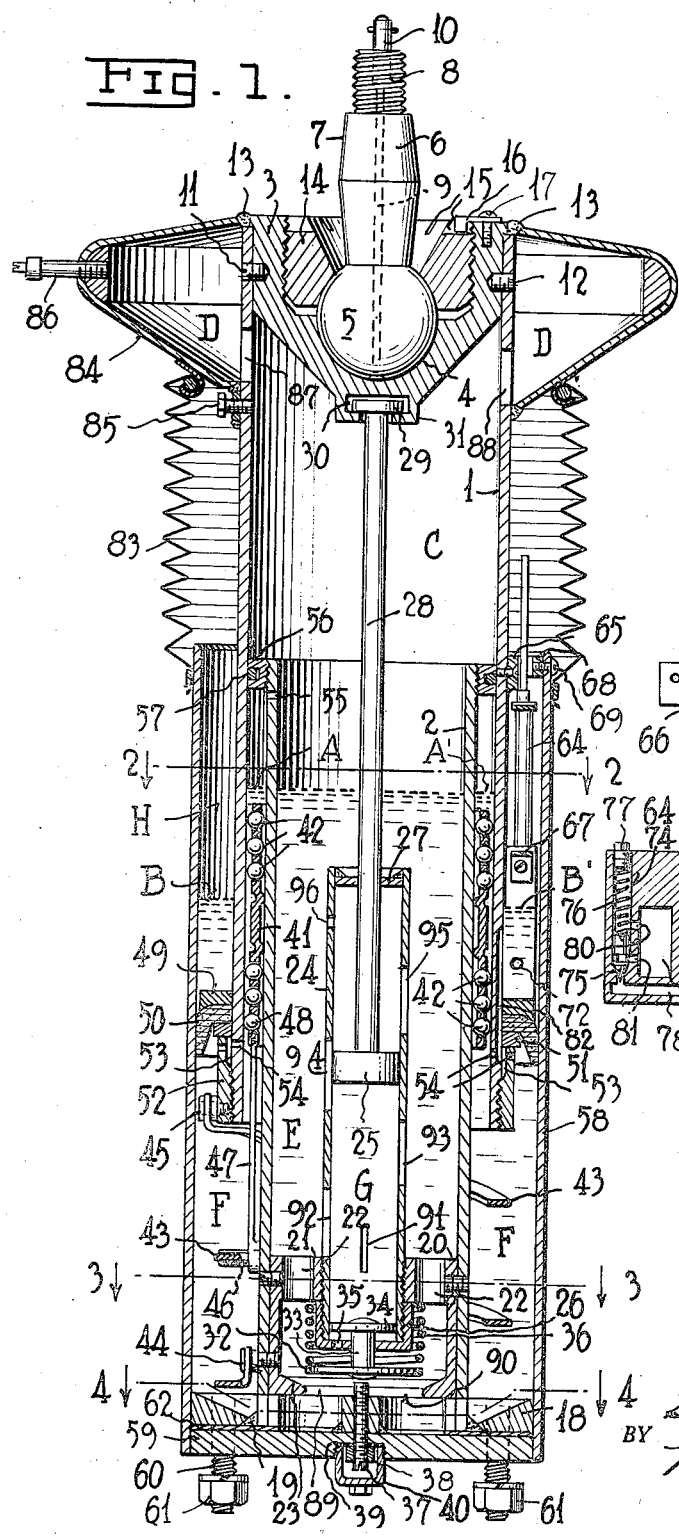
INVENTOR.
Stephen L. Coleman
BY
Clyde Grant
ATTORNEY July 9, 1940.   S. L. C. COLEMAN   2,207,088
FLUID PRESSURE SPRING DEVICE
Filed Oct. 8, 1937   4 Sheets-Sheet 2
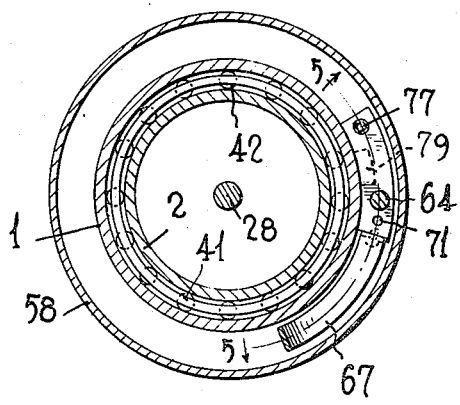
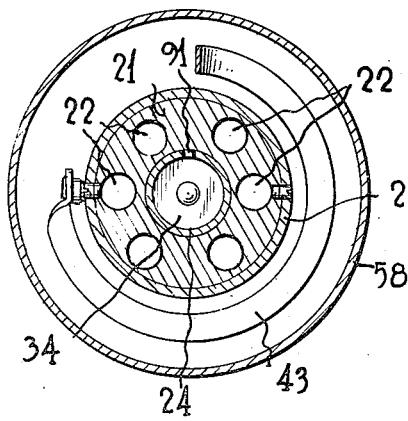
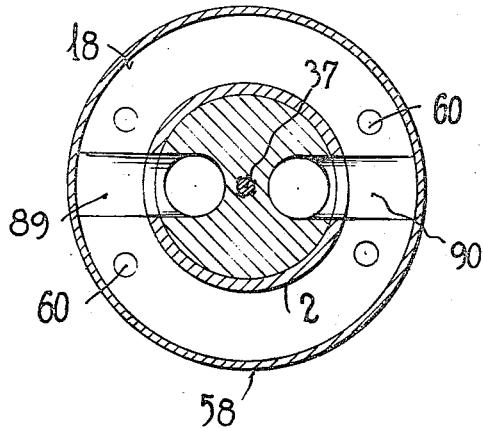
INVENTOR.
Stephen L. Coleman,
BY
ATTORNEY

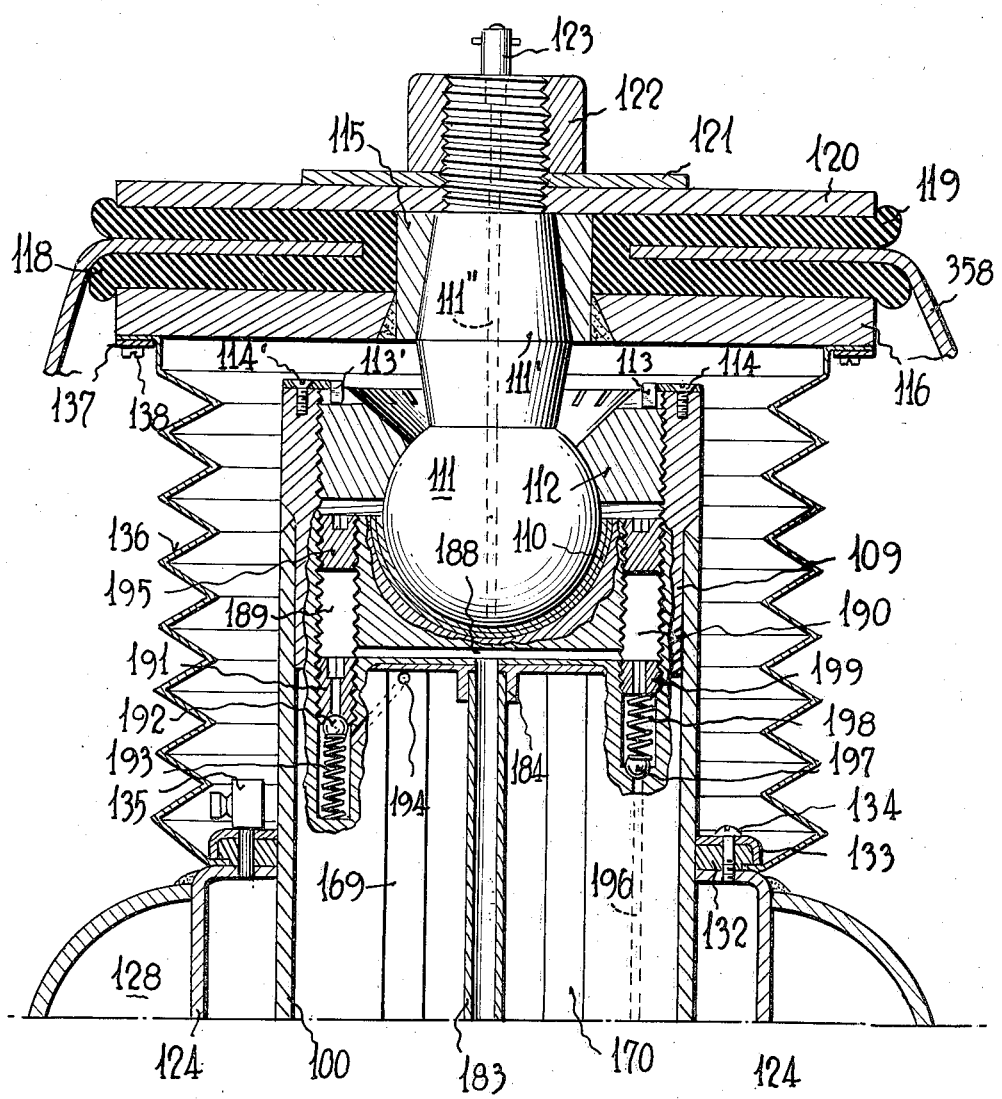

July 9, 1940.   S. L. C. COLEMAN   2,207,088
FLUID PRESSURE SPRING DEVICE
Filed Oct. 8, 1937   4 Sheets-Sheet 4
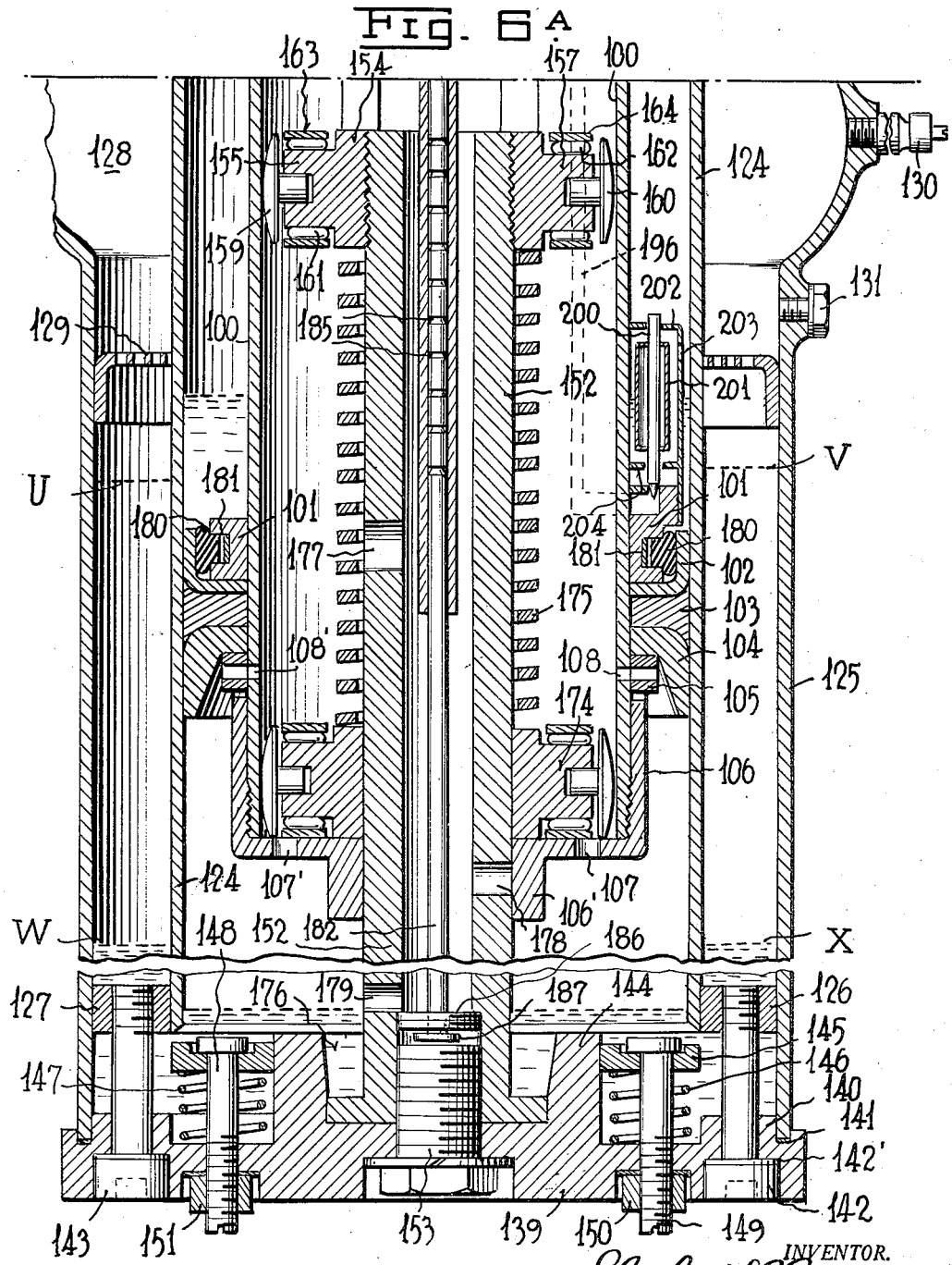

Patented July 9, 1940

2,207,088

UNITED STATES PATENT OFFICE 2,207,088

FLUID PRESSURE SPRING DEVICE

Stephen L. C. Coleman, Fredericton, New Brunswick, Canada

Application October 8, 1937, Serial No. 168,088

11 Claims. (Cl. 267—64)

This invention relates to certain improvements in spring devices and particularly to a combined fluid pressure and mechanical device of novel construction adaptable to all uses where it is desired to modify or check impact or rebound, the said device being capable of use alone as a unit, or in combination with any type of spring suspension in lieu of the conventional springs.

Broadly considered the object of this invention is to provide a light durable and efficient spring device combining in said structure, in a novel manner, the desirable properties or features of air and hydraulic pressure, together with certain mechanical instrumentalities for controlling and regulating said pressures.

Another object of the invention is to provide a combined pneumatic and hydraulic shock absorbing device which will eliminate the necessity of using, on various spring suspensions, comparatively heavy steel suspension springs and separate shock absorbers.

A further object of the invention is the provision of a shock absorbing device of the fluid pressure type embodying built-in anti-frictional bearings, so as to secure the softest possible action.

A still further object of the invention is to provide for automatic control of the volume of confined oil under pressure, so that under a given load the air pressure will remain practically constant.

It is also another object of the invention to provide a self contained unit of such strength and dimensions that the average passenger automobile can be sprung with the use of only two of such units.

The present invention is illustrated in the accompanying drawings in which:

Figure 1 is a vertical transverse sectional view of the improved device,

Figure 2 is a horizontal sectional view on line 2—2 of Figure 1,

Figure 3 is a horizontal sectional view on line 3—3 of Figure 1,

Figure 4 is a horizontal sectional view on line 4—4 of Figure 1,

Figure 5 is a view partly in section and partly in elevation of the fluid pump positioned on the right hand side of the main device as shown in Figures 1 and 2, and Figures 6 and 6A are vertical sectional views illustrating a modified form of air spring.

Referring to the drawings in detail the improved shock-absorbing device comprises an outer tube or cylinder 1 and an inner telescoping tube or cylinder 2.

Secured to the upper end of the tube 1 is a header block 3 provided with a semi-spherical seat 4 to receive a spherical member or ball 5 formed integrally with a shank 6, said shank having a tapered portion 7 and a reduced threaded end portion 8 to receive a nut or the like (not shown) by means of what the upper end of the device is secured to the mass to be sprung. Through the longitudinal center of the ball 5 and the shank 6 there is a duct 9 provided with a grease gun fitting 10, whereby the necessary lubricant is supplied through the duct 9 to the load bearing surface of the ball and socket joint formed by the parts 4 and 5.

The header block 3 is primarily adjusted and secured in place within the tube 1, by set screws 11 and 12, and then finally welded around its top circumference as at 13 to make an air tight joint.

The ball 5 is held in position and adjusted to a proper working engagement by the annular member 14 threaded into the header 3 as shown. The top surface of the adjusting annular member 14 is provided with a series of spaced slots or grooves 15 and when said member 14 is properly adjusted it is locked against rotation relative to the block 3, by a keeper plate or key 16 secured to said block 3 by a set screw or the like 17, the free end of said key being in engagement with one of the slots 15.

Secured to the lower end of the inner tube 2, is a metal annular member or ring 18, tightly fitted around said tube and welded thereto as at 19.

Tightly fitted within the lower end of the tube 2 is a relatively short reinforcing tube section 20, the lower edge of said reenforcing tube and the lower edges of the ring 18 being in the same plane with the lower edge of the tube 2.

The upper edge of the reinforcing tube section 20 is constructed with an inwardly extending annular flange or head 21 provided with a series of spaced ports 22, and the lower edge of said tube section 20 is formed with an inwardly extending annular shoulder or flange 23.

Positioned within the tube 2 and concentric therewith is a smaller tube 24 provided with a piston 25, said tube 24 having its lower end threaded into the head 21 and locked therein by the cap-piece 26 also threaded onto the lower end of said tube 24. The upper or inner end of the tube 24 is provided with a welded in head or cap 27, through which operates with a sliding fit, a rod 28 for the piston 25, the upper end of said rod 28 terminating in an enlarged disk-like head 29 loosely fitting into a slot 30 formed on a boss 31 carried by the header block 3.

Mounted adjacent the lower end of the tube 24 is a disk valve 32, adapted to cooperate with the annular shoulder or flange 23 for controlling the size of this central port. This disk valve 32 is firmly secured to one end of a short rod or pin 33 passing with a sliding fit through a bearing in the center of the cap-piece 26, the opposite end of said pin 33 having secured thereto a disk head 34 having a sliding engagement within the lower end of the tube 24. A bleeder hole 35 is provided in the cap-piece 26 or bottom of tube 24 for the purpose to be hereinafter described.

The disk valve 32 is urged downwardly by a coil spring 36 and this downward movement and the size of the opening between the disk valve 32 and the annular member 23 is regulated and governed by an adjusting screw 37. This adjusting screw 37 is provided with a lock nut 38 and packing 39 and this outer end of the adjusting screw 37 is adapted to be enclosed and sealed within a cap nut 40.

These various parts just described in connection with the tube 24, comprise a dash pot tending to limit both extremes of the spring stroke.

Mounted between the telescoping tubes 1 and 2 is a ball bearing assembly comprising an annular cage 41 providing a retainer for a large number of balls 42, said assembly acting as an anti-frictional bearing between these telescoping members. The balls are preferably placed at close regular intervals in circles around the circumference of the retaining cage 41, the diameter of the holes in the cage being slightly larger than the diameter of the balls so as to permit true rolling thereof.

Disposed around the lower outside portion of the tube 2, and concentric therewith, is a coil spring 43 made of flat spring steel coiled on edge. The bottom or lower edge of this coil spring 43 is offset and turned up and said end is pivotally attached to tube 2 by a set screw or the like 44 and the upper end of said spring is similarly constructed and attached to the tube 1 by a set screw 45. The intermediate portion of the spring 43 has secured thereto a pin or stub shaft 46, said pin 46 being also secured to the lower end of a rod or link 47, the upper end of said link 47 terminating in a ball 48 loosely fitting into a hole and slot in the bottom edge of the ball cage 41.

Encircling the outer circumference of the tube 1, adjacent the lower end thereof, and securely fastened thereto, is an annular flange or ring 49, said ring being shaped to form a seat for an annular high pressure leather pump gasket 50 as shown. This gasket 50 is firmly secured against its seat 49, by a ring 51 which in turn is forced against the gasket 50 by a securing ring 52 threaded onto the lower outside end of tube 1. The upper inner annular face of the securing ring 52 is provided with a circumferential recess 53 in communication with bleeder ports 54 also formed in the ring 52 and the lower end of the tube 1. There is also provided in the upper end of the tube 2, a bleeder port 55.

Securely threaded on the upper end of the tube 2 is a ring 56 provided with an outside annular groove to receive a piston ring 57 which closes the opening between the top of said tube 2 and the inner wall of the tube 1 and at the same time properly centers the tube 2 under working condition and prevents the air under pressure in chamber C from flowing down between the walls of tubes 1 and 2, into chamber F which would nullify the restraining influence of disk valve 32.

Concentrically disposed about the telescoping tubes 1 and 2 is an outside tube or casing 58 said casing being spaced from the tube 1 and closely embracing the packing ring 50 hereinbefore referred to. The lower end of this casing 58 is provided with a solid bottom 59 preferably welded thereto.

The annular member or ring 18, secured to the bottom of the tube 2 has fixed thereon a series of studs 60 projecting downwardly and passing through the bottom member 59 of the outside tube 58 providing the means for securing together the bottom 59 and the ring 18, and also acting as an attaching means, whereby the bottom of the complete device is secured or mounted in operative position by nuts or the like 61, and positioned between the bottom member 59 and the ring 18, is a gasket 62 to prevent leakage around the studs 60.

Mounted in one side of the device, between the tube 1 and the outside casing or tube 58 is a fluid pump 63 the purpose of which is to be hereinafter more fully explained.

With particular reference to Figures 1-5 and 6, this pump assembly 63 comprises a plunger 64 the upper end of which being reduced and provided with a guide bearing 65 and a stop washer 66 to limit its upward travel. This piston 64 is normally held in its outward position by a flat, U-shaped spring 67 and raises said piston after each downward stroke. The guide bearing is secured to the tube 1 by set screws as shown in Figure 1, and a stop member 68 is secured inside the top of the casing 58 by set screws or the like 69.

Cooperating with the piston 64 is a cylindrical bore 70 formed in the pump assembly and said assembly is also provided with a feed duct 71 fed by a port 72 said duct 71 at its upper end being in communication with the cylinder 70 through port 73. This pump assembly is also formed with a valve chamber 74 provided with a lift valve 75 normally held down by a spring 76 to seal the opening at the bottom of chamber 74, and the upper end of the chamber 74 is closed by a plug or the like 77, which at the same time forms a backing for the spring 76. Connecting the chamber 74 with the cylinder 70 is a horizontal duct or passage 78.

Disposed between the cylinder 70 and the valve chamber 74 is an enlarged chamber 79, said chamber 79 being in communication with the valve chamber 74 through ports 80 and 81.

Between the pump assembly and the adjacent face of the tube 1 there is provided in the exterior wall of said tube 1 a duct or passage 82, connecting chamber 79 with the recess 53 provided in the securing ring 52, which recess in turn being connected through ports 54 with the interior of the outside tube or casing 58 as hereinbefore described.

This pump assembly 63 is brazed or otherwise securely fastened to the outside face of tube 1 and bodily movable therewith during the operation of the device.

Extending upwardly from the upper end of the casing 58 is a flexible bellows 83, the upper end of said bellows being attached to a hollow metallic header or dome 84, surrounding and welded to the top of the tube 1, whereby all dust and dirt will be excluded from the chamber within the casing 58. Just below the header 84, the tube 1 is provided with an oil filler plug 85 and the header 84 is supplied with an air filler valve 86.

Connecting the interior of the tube 1 with the interior of the header 84 are ports 87 and 88 and at the lower end of the device ports 89 and 90 formed in the annular member or ring 18, tube 2 and tube section 20, connect the interior of tube 58 with the interior of the tube 2.

The dash-pot tube 24 is provided with a number of ports 91, 92, 93, 94, 95 and 96 to permit the passage therethrough of oil during the operation of the device.

To prepare the air spring for use it is fully telescoped, and plug 85 removed, and a charge of dewaxed oil is forced into the interior of the case until it reaches the level of the filler port which is then closed by replacing plug 85. Air under pressure is then applied through air valve 86 and the air spring is thereby extended raising the vehicle where the device is used in connection with a vehicle spring suspension. When it reaches its normal height, which can be ascertained by measurement, the cap of valve 86 is replaced, and the spring is ready for use. Any air trapped at the top of chamber F below gasket 50 is vented through the small bleeder ports 54 and escapes through vent 55 into main air chamber C. A quantity of oil is then placed in atmospheric pressure chamber H to bring it up to the level of the dotted line B, B', and to provide an oil seal and keep the leather gasket 50 in good condition.

In action when the sprung mass falls, or the wheels rise to pass over an obstruction, the air spring is telescoped, and some of the oil in chamber F is forced through ports 89 and 90 past disk valve 32 and past ports 22 into chamber E to rise above the dotted line A, A' and it further compresses the air in air chamber C and D; when this action has proceeded far enough to absorb the shock, the air gradually expands again to its original volume forcing the oil back past disk valve 32 and through the ports 89, and 90 into outside chamber F and the air spring returns to its original normal length.

In case of a very violent shock the disk valve 32 can rise and compress coil spring 36 thus giving a greater opening for the oil to pass through and acting as a safety device to prevent excessive shock. As soon as the oil stops flowing from outside chamber F into inside chamber E, coil spring 36 forces the disk valve down against adjusting screw 37 and the opening past the disk valve 32 is restricted. This controls the speed of the oil flow back from chamber E to F and consequently controls the speed of the rebound.

The amount of the set opening of disk valve 32 can be adjusted from the outside, through the removal of cap nut 40, the loosening of lock nut 38 and the turning of adjusting screw 37.

The chief advantage of the anti-friction ball bearing assembly here employed, consisting of retaining cage 41 and balls 42, is efficiency, simplicity and cheapness. The only precision measurement work required is on the inside of tube 1 and outside of tube 2. These surfaces would require hardening and grinding to make a suitable surface for the ball bearings to operate upon.

It is quite evident that the cage 41 acted upon by gravity, vibration and constant changing of the direction of pressure, would in time fall to the bottom of chamber F and be out of commission. To guard against this possibility and yet not interfere with true rolling of the balls in the bearing, the simple half movement device is employed, consisting of the coil spring 43 and drag link 47. If the top end of the coil spring moves a certain distance it is quite evident that the center of the length of the spring will move half as much in the same direction, therefore by tying one end of the coil spring to one telescoping tube, as at 45, and the other end to the other telescoping tube, as at 44, and tying the center of the coil spring, as at 46, by drag link 47 to retaining cage 41, then the retaining cage will always be in its proper relative position to the ends of its runway between tubes 1 and 2.

One advantage of an air spring is its relative softness at the first part of its compression stroke and it is essential, in order to preserve this advantage, to eliminate as much static friction as possible, so that the spring will start compressing without initial shock due to this friction. By employing a ball or roller bearing the greater part of friction is eliminated.

If the same volume of air is always retained in the air spring, the pressure will remain constant under the same load. In the air spring as illustrated in Figure 1, the air is not in contact with the leather gasket there being an oil seal extending far above the top of the gasket. Any air which enters the oil through emulsification and rises to the leather gasket 50 will flow through ports 52 and rise between walls of tube 1 and 2 until it reaches the abutment ring 56, it will then flow through port 55 back into the main air chamber C. Through this means air will be kept away from the leather gasket 50.

In course of time a certain amount of oil may, through seepage, work past the leather gasket 50 into the atmospheric pressure chamber H and join with the oil that is already in there to the height of dotted line B, B'. When enough leakage past gasket 50 takes place to raise the oil in chamber H so that it reaches the height of port 73 in the pump, Figure 2, it flows through port 73 and charges the pump cylinder 70, then when the telescoping cylinders of the air spring lengthen through rebound or other cause, the stop 68, fast to the inside top of outside cylinder 58, comes in contact with the washer 66 on pump piston 64 and forces it down. This forces the charge of oil out of pump cylinder 70, through duct 78, raises valve 75, discharges through port 81 into chamber 79, and from there it passes through duct 82 through ports 54 back where it came from in oil chamber F. The port 80 in the pump is for the purpose of letting the pressure in chamber 79, which is the same as that in oil chamber F, in on top of valve 75 to supplement the pressure of the coil spring 76 and keep valve 75 tight against possible leakage.

From the above it is apparent, that the volume of oil under pressure inside the air spring is maintained automatically. This being the case, the volume of air and its pressure, under normal load will not change, unless leakage develops in the air chambers which possibility is very remote.

The double acting shock absorber is of very simple construction. The resistance offered to the flow of oil past valve 32 on the compression stroke of the air spring, is governed by the amount of opening between the valve and its seat. The disk valve 32 being held down in contact with adjusting screw 37 by the coil spring 36, the resistance offered by the oil passing through the restricted opening about valve 32 can be controlled by the rate of resistance to compression of the coil spring 36, which acts as a safety device to prevent the building up of too great a shock. The amount of the initial opening of the disk valve 32 can be adjusted from the outside by removing cap nut 40, loosening lock nut 38, allowing screw 37 to be turned to raise or lower disk valve 32 as desired.

On the expanding or rebound stroke of the air spring, the expanding air in chambers C and D forces oil out of chamber E down past valve 32, through ports 89 and 90 into chamber F thus restoring the air spring to the original length it had before the compression stroke. It is quite evident that the amount of opening between disk valve 32 and its seat 23 will restrict the speed of the flow of oil from chamber E to chamber F, and in so doing will govern the speed of rebound of the sprung mass.

The dash pot 24 with its piston 25 is to prevent metal to metal contact on either extreme of the air spring stroke. On the compression stroke the piston 25 approaches the bottom of the tube. On its way down it forces the oil out ahead of it through slots 94, 93, 92 and 91. As slot after slot is passed the amount of opening for the escape of oil grows less so there is a progressive resistance. When finally the last slot is passed by the piston 25, the only escape for the oil is past the piston, and this being a neat fit a lot of resistance is set up thus bringing the parts to rest. When the piston passes port 91 there is a very heavy pressure exerted on the disk 54 which holds disk valve 32 down firmly against its adjusting screw 37, and this increases the resistance against bottoming by increasing the oil pressure in chamber F.

Referring to Figures 6 and 6A there is illustrated a modified construction of shock absorber or air spring. This air spring comprises a metal tube 100 having welded to it at its lower end, a circular flange 101, shaped to support the leather cup packing 102. A metal flange ring 103 is slipped over the end of tube 100 and is interposed between the leather cup packing 102 and a leather cup packing 104 and is shaped to provide support for both of said cup packings, in conjunction with the metal ring 105, slipped over the bottom end of tube 100 and embracing the leather cup packing 104. The lower end of the tube 100 is provided with a metal cap 106 having an internal thread by means of which it is screwed onto a corresponding thread on the outside of the bottom of tube 100. When the cap 106 is screwed up tight, it firmly holds the piston packing assembly 102, 103, 104 and 105 in place, and prevents leakage along the side of tube 100. At the bottom of cap piece 106 is an annular flange 106', which acts as a plunger for a dash pot 176 directly below it in the base of the air spring. Arranged in the bottom of the cap 106 are small ports 107 and 107'. In ring 105 are provided small ports 108 and 108' communicating with a groove cut on the inside of said ring 105 and thus insuring registry with corresponding ports in tube 100.

The top of piston tube 100 is sealed by plug 109 welded thereto, and in the center of said plug is a semi-spherical socket provided with a soft metal lining 110 which seats ball joint 111. An annular socket 112 embraces the top part of the ball 111 and is threaded into the top part of plug 109 which serves to retain the ball in place and furnish adjustment for the ball and socket joint. Socket 112 is locked in adjusted position by means of lugs 113 and 113' which are fitted in slots cut in the top of socket ring 112 and secured to the plug 109 by screws 114 and 114'.

The ball joint 111 has a tapered shank 111', which is seated in a tapered hole in a ring flange 115 welded to a circular plate 116, supported by the plate 358 to which the upper end of the device is to be attached. Between plates 116 and 158 is interposed a circular rubber pad 118, and on top of plate 158 is another circular rubber pad 119 and on top of this is a steel circular plate 120 surmounted by a steel washer 121, the whole assembly being firmly drawn together by a nut 122 threaded on the shank 111'. The hole in plate 158 is larger in diameter than the ring flange 115 of the plate 116 which passes through it. This space is filled with rubber so there is no metal to metal contact between the air spring and attached part. There is a duct 111'' drilled down through shank 111' and ball 111 and into the top of duct 111'' is screwed a grease-gun fitting 123.

Surrounding the tube 100 is a circular steel tube 124 forming the compression chamber in which the piston on tube 100 moves up and down, and surrounding this tube 124 is a circular tube 125 providing the outside case for the complete assembly. The top of the tube 124 is spun over and fits around the piston tube 100 with a very loose fit. The bottom of tube 124 is fixed to the outside tube 125 by six blocks interposed between the two tubes and welded to both of them, and two of these blocks 126 and 127 are shown in section. The top of the outside case 125 is swelled out to form an air reservoir 128, the upper curved-over edges thereof butting against tube 124 to which it is welded. Just below this swelled out portion is a perforated annular plate 129 welded fast to the outside tube 125 and the space between the six blocks similar to 126 and 127 is closed by perforated plates (not shown) welded to the blocks, and the space between these plates and annular plate 129 is filled with brass or copper wool. 130 is an air valve, and 131 an oil filler plug. On top of the tube 124 is a felt dust ring 132, forming a seal between tubes 100 and 124, held in place by a metal flange ring 133 secured by a number of screws or the like 134. 135 is an oil filler, and 136 is a fabric or rubber bellows to exclude dust and dirt. It is secured at its bottom by being placed beneath flanged ring 133 and at its top it is fastened to the plate 116 by means of a metal ring 137 fastened to plate 116 by a number of screws 138.

A circular base plate 139 has formed integral with it, a raised annular flange 140 near its outer circumference over which the outside tube 125 fits. Outside and below flange 140, there is a groove to accommodate a soft metal washer 141. Adjacent this point are six studs passing up through holes in the base plate 139 and screwed into the six blocks welded between tubes 124 and 125. One of these studs 142 is shown threaded into plug 126, and another stud 143 is shown threaded into plug 127. The six studs mentioned combine to pull case 125 down firmly on gasket 141 and seal the joint tightly. Each one of these six studs like 142 has a gasket 142' between its head and the base plate 139 to prevent leakage.

Raised above the body of the base plate 139 to a level with the bottom of tube 124 is an annular flange 144, and cooperating with the upper outer edge of this flange and the lower edge of the tube 124 is a flat annular valve member 145 adapted to close the annular space between these parts.

This valve 145 is held up by four coil springs, two of which are shown at 146 and 147, and is guided, and its height governed, by four studs passing down through corresponding holes with a slidable fit, two of these studs being shown at 148 and 149. These studs are screwed into threaded holes in the base plate 139 and their projecting ends have a screw driver slot for adjustment, said adjustments being maintained by lock nuts as shown at 150 and 151.

In the center of the air spring is a thick walled tube 152 of comparatively small diameter, the bottom end of said tube being flanged and tightly seated in a cavity in the center of ring 144, and secured by a stout threaded stud 153 passing up through a hole in the exact center of base plate 139, and screwed into a thread on the inside of tube 152, the tube 152 passing, with a loose fit, up through a hole defined by the flange 106' depending from the cap 106. At the top end of tube 152 there is a stout ring 154 threaded onto the outside of tube 152. Ring 154 has formed integral therewith four projecting stub shafts 155, 156, 157 and 158 placed at equally spaced intervals around its outside circumference, said stub shafts having mounted thereon a needle roller bearing, 159 and 160 being the cap pieces, 161 and 162 the needle rollers, and 163 and 164 the outside cases of the needle roller bearings.

Between the annular flange 144 and 152, is a cavity 176 which acts as a dash pot.

There are three ports 177, 178 and 179 through the wall of tube 152. All the space in tube 152 and tube 100 is full of oil, and all the space below the piston in tube 124 is full of oil, and there is an inch of oil on top of the piston in tube 124. The level of the oil in the outer chamber when the piston is in normal position is at the dotted line W. X. and is kept there by air pressure in reservoir 128 and under full down stroke of the piston 100 the oil rises to the dotted line U. V. Backing up the leather cup gasket 102, is a circular hard felt ring 180, and back of this is a waved circular steel spring 181.

In the center of the air spring is a reciprocating pump composed of a piston rod 182 acting in the tube 183, mounted in a boss 184 on the bottom center of block 109, this joint being sealed against leakage. Piston rod 182 has a number of shallow sealing grooves 185 at its upper end to increase its efficiency. A threaded plug 186 is screwed into the bottom of tube 152, having a hole in its center of larger diameter than piston rod 182 which passes up through it, said rod having a flanged end 187 of greater diameter than the hole in plug 186 and it is loosely held between plug 186 and stud 153. This construction permits self-aligning of the pump parts.

Associated with the upper end of tube 183 is a transverse conduit 188 communicating with the interior of pump tube 183 leading at one end into the vertical bore 189 and at the other into the vertical bore 190. A threaded plug 191 with a port through its center is screwed into the threaded bore 189 until it seats below the level of conduit 188. The bottom of plug 191 has a seat to accommodate a steel ball 192 which acts as a valve for the port in the center of plug 191. The ball 192 is held up against its seat by a coil spring 193, and a port 194 connects bore 189 with the interior of tube 100. The top of bore 189 is sealed by a threaded plug 195. A conduit 196 is drilled down through one of the four abutments inside tube 100, connecting bore 190 with the atmospheric pressure chamber between tube 100 and 124.

This same conduit 188 communicates with a conduit 196 provided with a steel ball 197 acting as a valve to close this end of conduit 196. The ball is held against its seat by a coil spring 198, and a threaded plug 199 is screwed down into bore 190 until it seats below the level of conduit 188, plug 199 having a port through its center.

The flow of oil through the mouth of conduit 196 is controlled by a needle valve 200 carrying a metal float 201, said float being enclosed in a metal box 202 fast to the outside of tube 100. This box 202 is oil tight and oil can enter it only through a port 203 set at the height desired for the oil in the chamber above the piston leather cup gaskets.

Needle valve 200 is positioned and guided by being passed, with a loose fit, through box 202 at its top and through partition 204 near its bottom.

The vertical bores 189 and 190 pass down through the head block 109 and into the vertical abutments 169 and 170 inside the tube 100.

To prepare the air spring illlustrated in Figures 6 and 6A, for use it is fully telescoped, and plug 131 and plug 135 are removed, and a charge of dewaxed oil is forced into the interior of the case until it reaches the level of the filler port at 131 which is then closed. A little air pressure is put in the air reservoir 128 through air valve 130, which will force the oil down in the outside chamber and into the piston cylinder (inside tube 124), passing also into tube 152 and tube 100 through port 179. Any air trapped below the leather cup gasket 104 is vented through the small vents 108 and 108', and the chamber 100 is freed of air through the top vent at 194 by depressing ball 192 with a wire through bore 189. As soon as all the air is expelled from the inside tube 100 the oil begins to flow, and the valve 192 is closed. A small quantity of oil is forced in through filler 135 on top of the leather piston gasket 102, which acts as a seal and keeps the leather in good condition. The air spring is then placed in position and given its maximum static load, after which air pressure is applied through valve 130 until the piston rises to its desired height. The air spring is then ready for service.

In action, when the body falls or the wheels rise to pass over an obstruction, the air spring is telescoped, increasing the pressure in the piston cylinder beneath the piston, some of the oil being forced out of the piston cylinder past valve 145 into the outside chamber, where the rising oil further compresses the air in the top of this air chamber until the air pressure overcomes the pressure of the oil. The shock which caused the telescoping of the air spring, having passed, the air pressure forces the oil back into the piston cylinder and causes the piston to rise to its original position.

In case of a very violent shock, the circular valve 145 being supported on top of coil springs 146 and 147, can recede and increase the valve opening in proportion to the force, thus acting as a safety device. As soon as the oil stops flowing from the piston cylinder into the outside air chamber, the coil springs force the valve 145 up to its set opening. The amount of opening of the valve 145 on the rebound stroke of the air spring is controlled by the studs 148 and 149 and their mates, which studs can be lengthened or shortened between the valve 145 and the base plate by loosening lock nuts 150 and 151 and screwing them in or out. By this means the amount of opening of the valve 145 on the rebound stroke can be set to suit, and controls the speed of flow of the oil and consequently the speed of the rebound stroke.

In any spring suspension in order to secure the utmost softness, it is necessary to eliminate as much friction on the compression stroke as possible, therefore great care has been taken in this air spring to eliminate friction. As stated in the specification where the piston tube 100 passes through the top of piston cylinder 124 it has a very loose fit and there is no metal to metal contact. The telescoping contact is taken by the needle roller bearings mounted on rings 154 and 174 acting between telescoping tubes 100 and 152, resulting in a minimum of friction in these roller bearing contacts and there is no rubbing friction except between the leather cup gaskets and the cylinder wall, and as these contacts are bathed in lubricant, friction is held to a minimum.

If an extremely heavy shock is received forcing a full compression stroke of the piston, the plunger formed by ring 106' enters the dash pot 176 in the base plate and prevents the possibility of a metal to metal contact. Provision is made for a compression stroke of three inches from the normal static position and for an extension stroke of two inches from normal static position.

It is desirable to keep the bearing points 154 and 174 between the telescoping tubes 100 and 152 as far apart as possible so as to reduce the strain thereon under lateral thrusts. When tube 152 passes upward farther into the tube 100, it will carry the spider ring 174 with it, because there will be more friction between it and tube 152 than there will be between the roller bearings on 174 and the channel tracks on tube 100. On an extension stroke of the air spring from the normal static position, the center tube 152 is drawn further out of piston tube 100, it being free to slide through ring 174, this extension stroke being cushioned and limited by the coil spring 175.

When the spider ring 174 is carried upward by a compression stroke of the air spring, provision has been made to prevent it coming into violent contact with the cap piece 106 on its return stroke. As soon as port 178 enters ring 106' it is closed, and as the spider ring 174 closely fits the channels in the tube 100 for a distance of two inches from its bottom, a dash pot action is secured. The purpose of the small ports 107, 107' is to prevent vacuum drag holding 174 against cap piece 106 on the compression stroke of the air spring.

The rubber insulated joint at the top of the air spring will be very effective to eliminate high frequency vibration, because of the large area of bearing surface. The unit pressure per square inch is comparatively low, and soft rubber can be used and the ball and socket joint at the top of the air spring precludes the possibility of its being subjected to any heavy destructive twisting stresses. Conditions for lubrication in the ball and socket joint are perfect, because there is no possibility of the lubricant escaping. There are no oil coated surfaces exposed to dust or dirt, the device being completely closed. The possibility of leakage of either oil or air is very remote, and because of the lack of serious friction in the device it should be capable of long and constant service.

In Figures 6 and 6A is illustrated a method of connecting the air spring to a sprung mass through the medium of rubber insulation and it is to be understood that this same method is contemplated in connection with the construction as illustrated in Figure 1.

I claim:

1. In a fluid pressure spring device, the combination with a casing, of telescoping tubes within said casing, means for maintaining air within the upper part of said tubes, means for automatically maintaining a liquid at a predetermined level in the lower part of said tubes, antifrictional means positioned between the walls of said telescoping tubes, and a positive seal between said tubes.

2. In a fluid pressure spring device, the combination with a casing, of telescoping tubes within said casing, means for confining air within the upper part of said telescoping tubes and casing, means for automatically maintaining a liquid at a predetermined level in the lower part of said tubes and casing, antifrictional means positioned between the walls of said telescoping tubes, and a positive seal between said tubes and between said tubes and casing.

3. In a fluid pressure spring device, the combination with a casing, of telescoping tubes within said casing, means for spacing the walls of the outer telescoping tube from the walls of the casing, said means comprising a slidable fluid-tight seal, means for maintaining a liquid seal above said slidable fluid-tight seal, a slidable fluid-tight seal positioned between the walls of said telescoping tubes and means for confining a fluid within the telescoping tubes and casing under pressure.

4. In a fluid pressure spring device, the combination with a casing, of telescoping tubes within said casing, a dash-pot comprising a cylinder connected to one tube and a piston connected to the other tube and stepped openings in the walls of said cylinder, whereby a pressure resistance will be gradually built-up to automatically function as a positive stop only, upon the extreme inward and outward positions of the telescoping tubes.

5. In a fluid pressure spring device, the combination with a casing, of telescoping tubes within said casing, means for maintaining air within the upper part of said tubes, means for maintaining a liquid at a predetermined level in the lower part of said tubes, antifrictional means positioned between the walls of said telescoping tubes, means for maintaining said antifrictional means in operative position and a positive seal between said tubes.

6. In a fluid pressure spring device, the combination with a casing, of telescoping tubes within said casing, means for maintaining air within the upper part of said tubes, means for maintaining a liquid at a predetermined level in the lower part of said tubes, an annular substantially floating ball bearing assembly positioned between the walls of said telescoping tubes, means for maintaining said assembly in a predetermined position under all working conditions and a positive seal between said tubes.

7. In a fluid pressure spring device, the combination with a casing, of telescoping tubes within said casing, means for retaining a fluid within the telescoping tubes and casing, a pump body including a cylinder carried by the outer telescoping tube within the casing and movable therewith, a piston for said cylinder, a spring for normally maintaining said piston in retracted position, a stop carried by said casing and movable therewith in position to engage and urge said piston inwardly against said spring, whereby during the operation of the complete device said pump will be automatically operated by the relative movements in opposite directions of said outer tube and casing.

8. In a fluid pressure spring device, the combination with a casing, of telescoping tubes within said casing, means for retaining a fluid within the telescoping tubes, packing carried by the outer telescoping tube providing a slidable sealed joint between said tube and casing, means for maintaining a sealing fluid in the chamber above said packing, a pump mounted in said chamber adapted to be operated by the telescoping action of said spring device, said pump forming a communication between said chamber and the space below said packing, whereby upon the rise of the sealing fluid in said chamber above a predetermined level, said pump will automatically return said fluid to the space below said packing.

9. In a fluid pressure spring device, the combination with a casing, of telescoping tubes within said casing, means for admitting a liquid into said tubes and casing, means for introducing air under pressure above said liquid, a pump positioned between the outside tube and casing for automatically maintaining said liquid at a predetermined level and an expandible and contractable member connecting the upper end of said casing with the upper end of the outer telescoping tube.

10. In a fluid pressure spring device, the combination with a casing, of telescoping tubes within said casing, means for admitting and retaining a liquid within said tubes and casing, means for introducing and retaining air under pressure above said liquid, a pump positioned between the outer tube and casing for automatically maintaining said liquid at a predetermined level, an expandible and contractable member providing a closure between the upper end of said casing and the upper end of the outer telescoping tube, a controllable restricted passageway between the lower end of said casing and the lower end of the inner telescoping tube and a dash pot mounted within said telescoping tubes.

11. In a fluid pressure spring device, the combination with a casing, of telescoping tubes within said casing, means for admitting and retaining a liquid within said tubes and casing, means for introducing and retaining air under pressure above said liquid, an expandible and contractable member providing a closure between the upper end of said casing and the upper end of the outer telescoping tube, an annular packing ring carried by the upper end of the inner telescoping tube providing a slidable seal between said upper end and the inner face of the outer telescoping tube, antifrictional means positioned between said tubes, an annular packing ring carried by the lower end of the outer telescoping tube providing a slidable sealed joint between said tube and casing, means for maintaining a sealing fluid in the chamber above said last mentioned packing ring, a pump mounted in said chamber adapted to be operated by the telescoping action of said spring devices, said pump forming a communication between said chamber and the space below said packing ring for maintaining said sealing fluid at a predetermined level, a manually regulated and automatically operated valve between the bottom of said casing and the lower end of the inner telescoping tube and a dash pot mounted within said telescoping tubes and controlled by the movements thereof for cushioning and limiting the extreme movements of said device.

STEPHEN L. C. COLEMAN.